United States Patent [19]
Knapczyk

[11] Patent Number: 5,371,739
[45] Date of Patent: Dec. 6, 1994

[54] SEQUENTIAL POLLING BUS ACCESS METHOD FOR RADIO COMMUNICATION SYSTEMS

[75] Inventor: Stanley Knapczyk, Justice, Ill.

[73] Assignee: Motorola, Inc., Schaumburg, Ill.

[21] Appl. No.: 905,602

[22] Filed: Jun. 29, 1992

[51] Int. Cl.$^5$ .............................................. H04J 3/02
[52] U.S. Cl. .................................. 370/85.8; 370/85.3; 370/85.6
[58] Field of Search ................. 370/85.8, 85.1, 85.6, 370/95.2, 85.3, 85.2; 340/825.05, 825.08, 825.07, 825.5; 395/650

[56] References Cited

U.S. PATENT DOCUMENTS

| | | | |
|---|---|---|---|
| 4,332,027 | 5/1982 | Malcolm et al. | 370/85.3 |
| 4,689,619 | 8/1987 | O'Brien, Jr. | 370/95.2 |
| 4,777,487 | 10/1988 | Boulton et al. | 370/85.6 |
| 4,860,006 | 8/1989 | Barall | 370/85.3 |
| 5,150,114 | 9/1992 | Johansson | 370/85.8 |
| 5,155,727 | 10/1992 | Borup et al. | 370/85.3 |
| 5,177,739 | 1/1993 | Basnuevo et al. | 370/85.8 |

Primary Examiner—Douglas W. Olms
Assistant Examiner—Shick Hom
Attorney, Agent, or Firm—James A. Coffing

[57] ABSTRACT

A radio communication system (600) having at least two radio interface devices (602) requires an access protocol for accessing a common information bus (605). The bus (605) is necessary for sending information to a communication system controller (601). A first of the interface devices periodically polls the common information bus (605) to determine whether or not it is available for sending information to the communication system controller (601). When available, the device acquires access to the bus (605), and sends information to the controller (601), via the information bus (605). The device then releases the bus (605) at a subsequent polling period for that device, thereafter allowing a second interface device to gain access to the bus (605). The foregoing sequence ensures that each of the interface devices (602) will, within a predetermined time, poll the bus (605) and acquire it, as necessary, for sending information to the system controller (601).

11 Claims, 2 Drawing Sheets

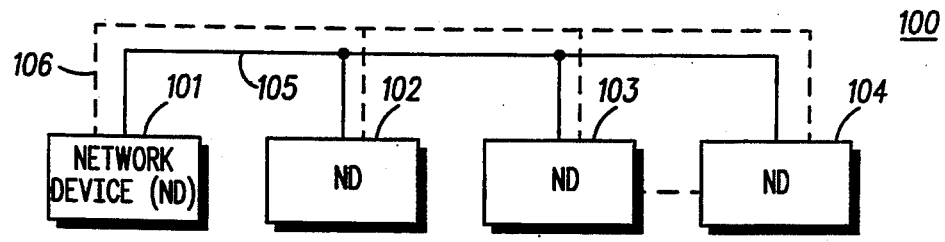
FIG.1 —PRIOR ART—
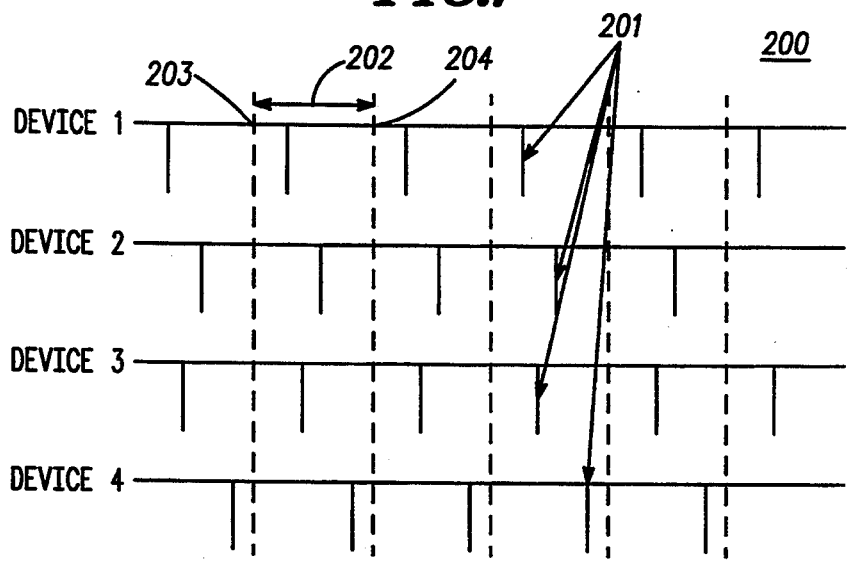
FIG.2 —PRIOR ART—
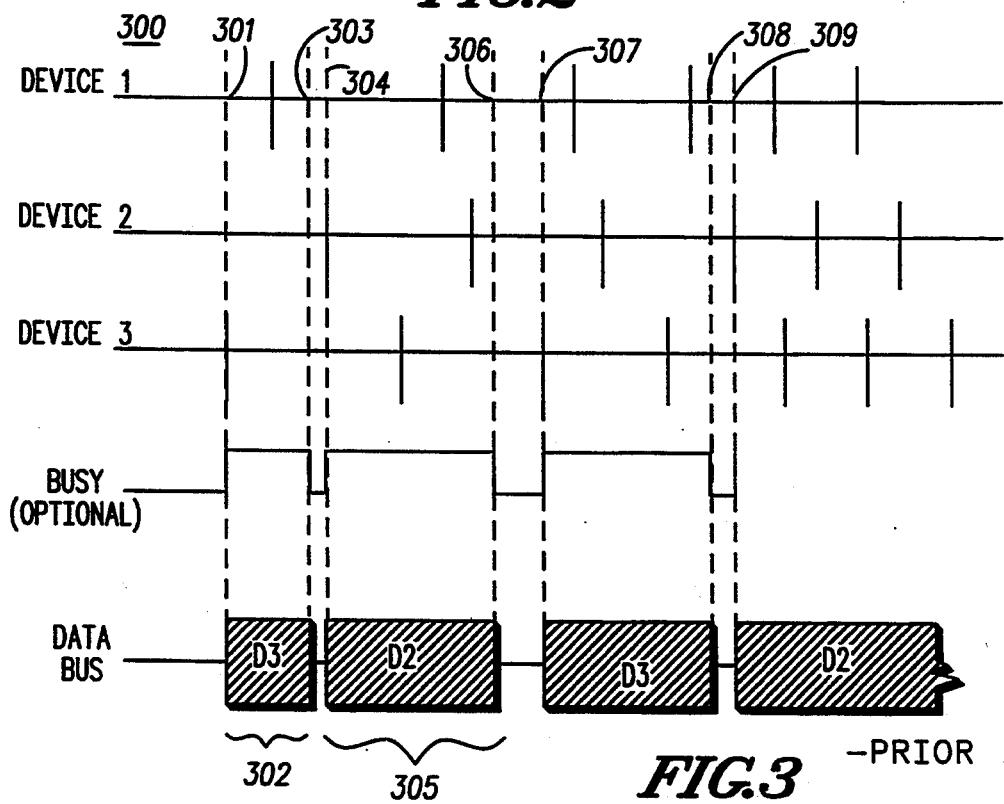
FIG.3 —PRIOR ART—

SEQUENTIAL POLLING BUS ACCESS METHOD FOR RADIO COMMUNICATION SYSTEMS

FIELD OF THE INVENTION

The invention relates generally to radio communication systems, and more particularly to such systems having devices which require access to a common information bus for sending information to a common device within the system.

BACKGROUND OF THE INVENTION

Computer architectures which include a plurality of network devices connected to a common data bus are well known in the art. Examples of such architectures include local area networks (LAN), computer servers, radio communication system repeater sites, etc.. Each of the foregoing examples require a bus access protocol which conforms to a rigorous set of requirements. In particular, design complexity, mean access time and transmission efficiency are all critical parameters which must be optimized for each application.

Mean access time represents an average time interval in which the network devices are able to send their respective messages out onto the data bus. In certain applications, the mean access time may be a critical requirement, as some of the devices might be quickly buffering messages to be sent across the bus. Without a properly chosen design, extended mean access times might result in device buffers being over run (i.e., while device is waiting for the bus), and hence lost data.

Transmission efficiency is generally related to the mean access time parameter, and describes the systems overall ability to distribute bus access privileges among the requesting devices. A system with high transmission efficiency is able to grant bus requests without excessive message buffering at any one of the requesting devices. Of course, as system complexity increases, and the number of network devices similarly increase, transmission efficiency is both more difficult to insure, and more critical to system performance. For example, in very busy systems where the bus is used often, access to the bus is often the limiting factor which determines how much information/data can be processed. An inefficient access protocol may require higher data rates, wider bandwidths, and more expressive components.

FIG. 1 shows a simplified block diagram of a data bus access system 100, which is well known in the art. Network devices 101-104 are coupled in parallel to data bus 105. Bus access (i.e., BUSY) line 106 is an optional feature which is sometimes used to show the status bus access privileges to each of the devices.

As an illustration of how the system 100 shown in FIG. 1 operates, FIG. 2 shows a timing diagram 200 illustrating the bus access methodology commonly used in today's systems. Each of the network devices is configured to poll the bus (i.e., check to see if the bus is available for transmission) at distinct polling periods 201. These polling periods represent periodically recurring events which take place once every polling interval 202. That is for the access scheme shown in FIG. 2, each of the network devices polls the data bus exactly once during a single polling interval (e.g., between times 203 and 204). It should be noted that the polling periods must be staggered in some fashion to prevent simultaneous polling of the data bus by multiple network devices. It should be further noted that the polling intervals for each device need not be identical (as they are in FIG. 2), but such an implementation represents a complex system design.

In order to show the shortcomings of the aforementioned access methodology, FIG. 3 shows a simplified timing diagram 300 which exemplifies a typical problem in the prior art access protocols. At time 301, D3 (i.e., device 3) begins sending message 302 on the data bus. At time 303, the conclusion of message 302, the bus becomes available for another device (including D3, if required) to access the bus. Subsequently, at time 304, device 2 sends message 305 on the data bus. Message 305 might be of such a length to completely span the polling interval (i.e., interval which, if the bus were available, would permit each device to poll at least once). At time 306, message 305 is completed, and the bus becomes available. Subsequently, D3 sends another message on to the bus, as it is the next device to poll the bus. Upon completion of this message, DEVICE 2 polls and accesses the bus, as it is the device whose polling period occurs first subsequent to when the bus becomes available. The foregoing pattern may repeat indefinitely so long as devices 2 and 3 have messages to be sent on the bus. Of course, this scheme is undesirable, since it denies bus access to device 1, irrespective of whether or not it has a message to be sent.

Accordingly, there exists a need for a data bus access protocol which is not constrained by the aforementioned shortcomings. In particular, a simple bus access protocol which prevents any one, or more, device(s) from monopolizing the bus would be an improvement over the prior art. This scheme would further provide a deterministic access sequence, such that the order of access can be determined from previous access patterns. Such a sequence would advantageously ensure finite, bounded, access times for each device in the system, while allowing priority scanning for particular devices, if desired. A system which employed such a scheme might therefore be well suited for use as a real time system controller in a radio communication system.

BRIEF DESCRIPTION OF THE DRAWINGS

FIG. 1 shows a simplified block diagram of a network having a common information bus coupled to several network devices, as known in the prior art.

FIG. 2 shows a timing diagram generally depicting the polling parameters for an access protocol which might be used by the network of FIG. 1, which parameters are known in the art.

FIG. 3 shows a timing diagram depicting a typical sequence of events which might result from the access protocol described in FIG. 2.

DETAILED DESCRIPTION OF A PREFERRED EMBODIMENT

The present invention encompasses a method of providing access to a common data bus to a plurality of devices coupled in a manner similar to that shown in FIG. 1. By using the access protocol scheme of the present invention, each device coupled to the data bus is guaranteed access to the bus within some finite length of time. That is, by modifying a simple access protocol, bus access monopolies are avoided while providing a deterministic access sequence for the network devices.

Figure 4:
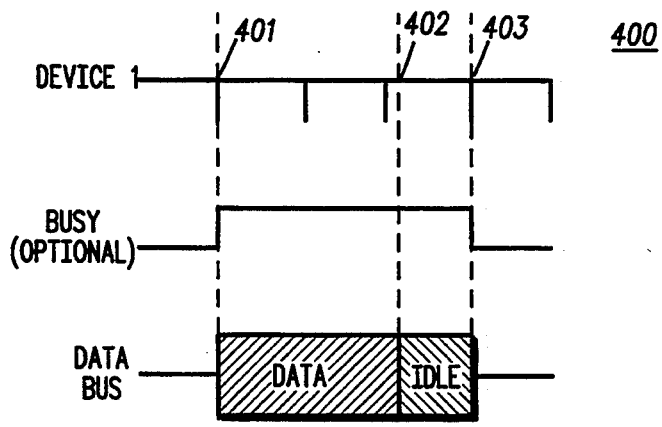
FIG. 4 shows a simplified timing diagram depicting a sequence of events which might result from an access protocol, in accordance with the present invention.

FIG. 4 shows a simplified timing diagram 400 depicting a preferred embodiment of the present invention. Assuming that device I has information to be sent (e.g., a buffered data message) on the information bus (e.g., data bus), it waits until its assigned polling period to poll the bus. At time 401 (i.e., first subsequent polling period), device 1 polls the bus to determine whether or not the bus is available for transmission. Since the bus is available (note the BUSY line is low just before time 401), device 1 acquires access to the bus and sends its message onto the data bus, as shown. At time completion 402, device 1 has completed sending its message, but does not relinquish the bus (as in the prior art schemes)- Rather, it holds onto the bus until its next (i.e., first subsequent) polling period 403, at which time it releases the bus. By holding onto the bus until its next polling period, the bus will always be polled next by the same device. That is, a predetermined sequence of polling is accomplished, thus ensuring that bus access tries are evenly distributed among all network devices, irrespective of the length of data messages transmitted. In an alternate embodiment, a predetermined few of the network devices might be placed in a first sequence, while others polled in a different sequence. This would allow for priority polling based on individual requirements of the devices coupled to the bus (i.e., some device messages may be more important than others).

Figure 5:
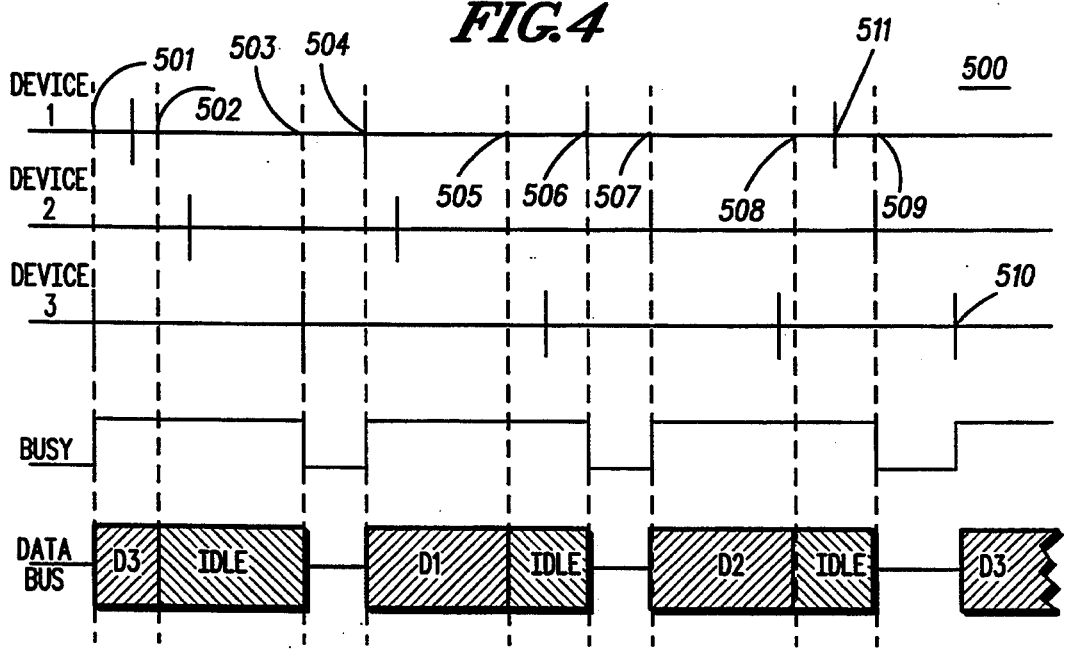
FIG. 5 shows a timing diagram depicting a sequence of events which might result from an access protocol, in accordance with the present invention.

FIG. 5 shows an improvement of the transmission sequence set forth in FIG. 2, in accordance with the present invention. In particular, timing diagram shows how the bus access methodology shown in FIG. 4 can be employed to prevent devices 2 and 3 from monopolizing the data bus, by allowing device I to poll the bus for access. For this example, it will be assumed that each of the three devices have multiple messages to send across the bus (i.e., if the bus is available, the polling device will occupy the bus for transmitting its next message). Starting at time 501, device 3 polls the bus, and acquires access to send its message on the bus. Device 3 completes sending its message at time 502, but does not release the bus until its subsequent polling period at time 503 (i.e. bus remains idle, as shown). At time 504, device 1 polls the bus, acquires access to it, and sends its information. Having completed its message at time 505, device 1 continues to hold the bus until its next polling period at time 506, or in the prioritized alternate embodiment earlier discussed, an integer valued subsequent polling period, where the integer describes the priority relationship between the holding device and a higher priority device. At time 507, device 2 polls the bus, acquires access, and sends its information. Device 2 completes sending its information on the bus at time 508, but again does not release the bus until its subsequent polling period at time 509. Device 3 then acquires the bus, at time 510, for sending its next (e.g., buffered) message onto the bus, which begins another cycle of the polling sequence. In this manner, a predetermined polling sequence is established (i.e., it should be clear that the 3-1-2 sequence would be maintained for as long as each device has information to transmit). In general, the sequence is determined by the staggering of the polling intervals at start-up (i.e., function of how the timing circuit for each device behaves at start-up). Thus, an improvement over the access method shown in FIG. 2 is provided which allows device I to transmit messages, thereby providing a deterministic access sequence (i.e., device 1 has a finite access time), while only marginally compromising the transmission efficiency for the system. (Note that the ratio of idle time-to-message length depicted in FIG. 5 is greatly exaggerated to show how the access protocol works. This ratio is, of course, substantially smaller in practice.)

To further illustrate the advantage of the transmitting device holding onto the bus until its subsequent polling period, consider what would have happened after device 2 transmitted its message. That is, if device 2 would have, as in prior art techniques, released the bus upon completion of its message at time 508, the aforementioned 3-1-2 sequence would not have been maintained. In particular, device 1 would have polled and acquired the bus next at time 511, resulting in a sequence which would allow device I access to the bus twice prior to device 3.

Figure 6:
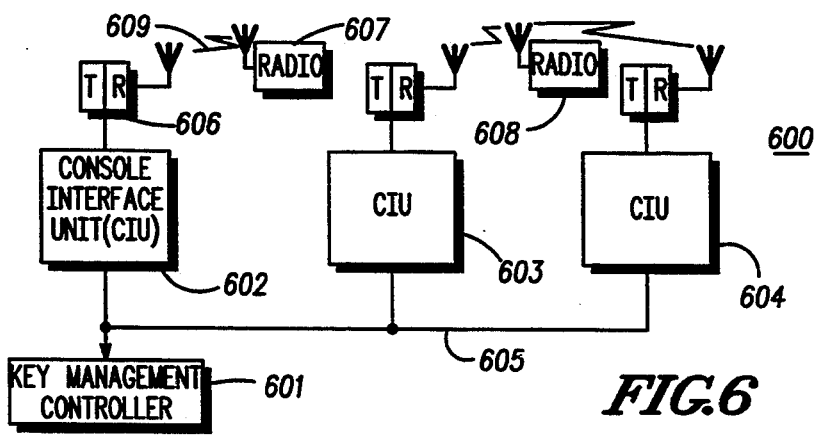
FIG. 6 shows a simplified diagram of a radio communication system which might employ the access protocol described in FIGS. 4 and 5, in accordance with the present invention.

FIG. 6 shows a radio communications system, including a key management controller (KMC) 601, and three console interface units (CIUs) 602-604 sharing a common bus 605. (Such an arrangement might be provided by Motorola Model No. C617AE, i.e., Advanced SECURENET CIU distribution panel.) Each CIU is further coupled to a base station, or repeater (e.g., CIU 602 coupled to repeater 606) for communicating with radios 607, 608, via radio frequency (RF) channel 609. Data messages are sent from radios 607., 608 (which may be portable and/or mobile units) to the repeaters in an asynchronous manner. The repeaters then relay the data messages to their respective CIU s. CIUs 602-604, in turn, send these data messages to KMC 601, via common bus 605. In a preferred embodiment of the invention, the CIUs have data buffering capability for storing messages which need to be sent (e.g., radio identifiers (IDs), data acknowledgement, etc.). Since these data buffers might be relatively small, it is important that the CIUs are able to place data onto the bus without long delays. That is, an increase in access time to the bus for one, or more, of the CIUs might overrun the data buffer, resulting in lost data. Therefore, it is imperative that each CIU has access to the bus within a reasonable amount of time. Of course, by adjusting the time intervals and the staggering of polling periods, the priority and sequence of access among the devices can be specifically tailored to the requirements of the system.

Accordingly, the present invention provides an improved method of accessing a common data bus, by simply modifying a known access protocol. This modification guarantees that no one device will monopolize the bus, thereby ensuring access to the bus for each requesting device within a predetermined time.

What is claimed is:

1. In a network having at lest two devices which require access to a common information bus for sending information to a common device, a method of providing access to the common information bus comprising the steps of:

at a first of the at least two devices;

a) polling, at a first polling interval, the common information bus to determine whether the common information bus is available for sending information to the common device;

b) when it is determined that the common information bus is available, acquiring access to the common information bus;

c) sending the information to the common device, via the common information bus until the information is complete at a completion time that falls between a first polling period and a second period;

d) holding the common information bus subsequent to the completion time; and e) releasing the common information bus at the second polling period.

2. The method of providing access according to claim 1, further comprising the step of, at a second of the at least two devices:

f) polling, at a second polling interval, the common information bus to determine whether the common information bus is available for sending information to the common device.

3. The method of providing access according to claim 2, wherein the first polling interval is different from the second polling interval.

4. The method of providing access according to claim 2, wherein step f) comprises the step of:

f1) polling the common information bus at an interval substantially equal to the second polling interval, and wherein the first polling interval is substantially timestaggered with respect to the second polling interval.

5. The method of providing access according to claim 1, wherein step c) comprises the step of:

c1) sending information pulses across a wireline.

6. The method of providing access according to claim 1, wherein step c) comprises the step of:

c1) transmitting digital information across a radio frequency (RF) channel.

7. The method of providing access according to claim 1, wherein the second polling interval is an integer multiple, N, of the first polling interval, and wherein step e) comprises the step of:

e1) releasing the common information bus at the Nth subsequent polling period after the completion time.

8. In a network having at least two devices which require access to a common information bus for sending information to a common device, a method of providing access to the common information bus comprising the steps of:

at a first of the at least two devices;

a) polling, at a first polling interval, the common information bus to determine whether the common information bus is available for sending information to the common device;

b) when it is determined that the common information bus is available, acquiring access to the common information bus;

c) sending information to the common device, via the common information bus, until a completion time;

d) holding the common information bus subsequent to the completion time, such that the common information bus is made available to a second of the at least two devices before the first device is allowed to re-acquire access to the common information bus; and at the second of the at least two devices;

e) polling, at a second polling interval, the common information bus to determine whether the common information bus is available for sending information to the common device.

9. The method of providing access according to claim 8, wherein the first polling interval is different from the second polling interval.

10. The method of providing access according to claim 8, wherein step e) comprises the step of:

e1) polling the common information bus at an interval substantially equal to the second polling interval, and wherein the first polling interval is substantially timestaggered with respect to the second polling interval.

11. In a radio communication system having at least two radio interface devices which require access to a common information bus for sending information to a communication system controller, a method of providing access to the common information bus comprising the steps of:

at a first of the at least two interface devices;

a) polling, at a first polling interval, the common information bus to determine whether the common information bus is available for sending information to the communication system controller;

b) when it is determined that the common information bus is available, acquiring access to the common information bus;

c) sending information to the communication system controller, via the common information bus, until a completion time;

d) holding the common information bus subsequent to the completion time, such that the common information bus is made available to a second of the at least two interface devices before the first interface device is allowed to reacquire access to the common information bus; and at the second of the at least two interface devices;

e) polling, at a second polling interval, the common information bus to determine whether the common information bus is available for sending information to the communication system controller.

* * * * *

UNITED STATES PATENT AND TRADEMARK OFFICE
CERTIFICATE OF CORRECTION

PATENT NO. : 5,371,739
DATED : 12/6/94
INVENTOR(S) : Stanley Knapczyk It is certified that error appears in the above-identified patent and that said Letters Patent is hereby corrected as shown below:

In Claim 4, Col. 5, line 26, please replace "f)" with --a)--.

In Claim 4, Col. 5, line 27, please replace "f1)" with --a1)--.

In Claim 10, Col. 6, line 22, please replace "e)" with --a)--.

In Claim 10, Col. 6, line 23, please replace "e1)" with --a1)--.

Signed and Sealed this

Ninth Day of May, 1995

Attest:

BRUCE LEHMAN

*Attesting Officer*  *Commissioner of Patents and Trademarks*